United States Patent
Won et al.

(10) Patent No.: US 9,985,695 B2
(45) Date of Patent: May 29, 2018

(54) WIRELESS POWER TRANSMISSION APPARATUS AND METHOD THEREFOR

(71) Applicant: INTELLECTUAL DISCOVERY CO., LTD., Seoul (KR)

(72) Inventors: Yun Jae Won, Seoul (KR); Seung Ok Lim, Seongnam-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 287 days.

(21) Appl. No.: 14/784,770

(22) PCT Filed: Apr. 17, 2014

(86) PCT No.: PCT/KR2014/003376
§ 371 (c)(1),
(2) Date: Oct. 15, 2015

(87) PCT Pub. No.: WO2014/171773
PCT Pub. Date: Oct. 23, 2014

(65) Prior Publication Data
US 2016/0087686 A1  Mar. 24, 2016

Related U.S. Application Data

(60) Provisional application No. 61/812,988, filed on Apr. 17, 2013.

(30) Foreign Application Priority Data

Apr. 20, 2013  (KR) .................. 10-2013-0048846
Apr. 30, 2013  (KR) .................. 10-2013-0048845

(51) Int. Cl.
*H02J 7/02*  (2016.01)
*H04B 5/00*  (2006.01)
(Continued)

(52) U.S. Cl.
CPC ............ *H04B 5/0037* (2013.01); *H02J 5/005* (2013.01); *H02J 7/025* (2013.01); *H02J 17/00* (2013.01);
(Continued)

(58) Field of Classification Search
CPC .......... H04B 5/0037; H02J 7/005; H02J 7/025
See application file for complete search history.

(56) References Cited

U.S. PATENT DOCUMENTS

2010/0171461 A1  7/2010  Baarman et al.
2012/0153894 A1  6/2012  Widmer
(Continued)

FOREIGN PATENT DOCUMENTS

EP  2 416 470 A1  2/2012
EP  2568572 A1  3/2013
(Continued)

OTHER PUBLICATIONS

International Search Report of PCT/KR2014/003376 dated Jul. 17, 2014 [PCT/ISA/210].
(Continued)

Primary Examiner — Jeffrey Shin
(74) Attorney, Agent, or Firm — Sughrue Mion, PLLC

(57) ABSTRACT

The present invention relates to a wireless power transmission apparatus and a method therefor, and more particularly to a wireless power transmission apparatus for supplying wirelessly power to a plurality of wireless power reception devices using different wireless power transmission/reception means. A wireless power transmission apparatus according the present invention includes: a power transmission module for transmitting wirelessly power by means of the magnetic field of one of a plurality of predetermined frequency bands; a communication module for communicating with a wireless power reception device; and a con-
(Continued)

troller for setting a power transmission mode based on a plurality of device profiles reflecting the frequency bands used for wireless power transmission/reception received from a plurality of wireless power reception devices.

14 Claims, 12 Drawing Sheets

(51) Int. Cl.
  *H02J 50/90* (2016.01)
  *H02J 50/80* (2016.01)
  *H02J 50/60* (2016.01)
  *H02J 50/10* (2016.01)
  *H02J 17/00* (2006.01)
  *H02J 5/00* (2016.01)

(52) U.S. Cl.
  CPC .............. *H02J 50/10* (2016.02); *H02J 50/60* (2016.02); *H02J 50/80* (2016.02); *H02J 50/90* (2016.02); *H04B 5/0062* (2013.01); *H04B 5/0075* (2013.01); *Y10T 307/25* (2015.04)

(56) References Cited

U.S. PATENT DOCUMENTS

| 2012/0202435 A1* | 8/2012 | Kim ..................... H04B 5/0037 455/69 |
| 2012/0280575 A1* | 11/2012 | Kim ....................... H02J 17/00 307/104 |
| 2012/0286726 A1* | 11/2012 | Kim ..................... B60L 11/182 320/108 |
| 2012/0326658 A1* | 12/2012 | Kim ......................... H02J 7/00 320/108 |

FOREIGN PATENT DOCUMENTS

| JP | 2010-187833 A | 9/2010 |
| KR | 10-2009-0096544 A | 9/2009 |
| KR | 10-2011-0094382 A | 8/2011 |
| KR | 10-2013-0023290 A | 3/2013 |

OTHER PUBLICATIONS

Communication dated Mar. 3, 2017 from the State Intellecutual Property Office of People's Republic of China in counterpart Application No. 201480021890.2.

* cited by examiner

WIRELESS POWER TRANSMISSION APPARATUS AND METHOD THEREFOR

CROSS REFERENCE TO RELATED APPLICATIONS

This application is a National Stage of International Application No. PCT/KR2014/003376, filed Apr. 17, 2014, claiming priorities based on U.S. Provisional Patent Application No. 61/812,988 filed Apr. 17, 2013, Korean Patent Application No. 10-2013-0048845 filed Apr. 30, 2013 and Korean Patent Application No. 10-2013-0048846 filed Apr. 30, 2013, the contents of all of which are incorporated herein by reference in their entirety.

BACKGROUND OF THE INVENTION

Field of the Invention

The present invention relates to an apparatus and a method for transmitting wireless power, and more particularly, to an apparatus and a method for transmitting wireless power that rapidly and precisely adjusts impedance so as to transmit desired power.

Discussion of the Related Art

A wireless power transmission technology is a technology that wirelessly transmits power between a power source and an electronic apparatus. As one example, the wireless power transmission technology can wirelessly charge a battery of a mobile terminal just by putting a mobile terminal such as a smart phone or a tablet on a wireless charging pad to provide higher mobility, convenience, and safety than a wired charging environment using the existing wired charging connector. Further, the wireless power transmission technology attracts public attention to substitute the existing wired power transmission environment in various fields such as medical treatment, leisure, a robot, and the like, which include home appliances and an electric vehicle afterwards in addition to wireless charging of the mobile terminal.

The wireless power transmission technology may be classified into a technology using electromagnetic wave radiation and a technology using an electromagnetic induction phenomenon, and since the technology using the electromagnetic wave radiation has a limit of efficiency depending on radiation loss consumed in the air, the technology using the electromagnetic induction phenomenon has been primarily researched in recent years.

The wireless power transmission technology using the electromagnetic induction phenomenon is generally classified into an electromagnetic inductive coupling scheme and a resonant magnetic coupling scheme.

The electromagnetic inductive coupling scheme is a scheme that transmits energy by using current induced to a coil at a receiving side due to a magnetic field generated at a coil at a transmitting side according to electromagnetic coupling between the coil at the transmitting side and the coil at the receiving side. The wireless power transmission technology of the electromagnetic inductive coupling scheme has an advantage that transmission efficiency is high, but has a disadvantage that a power transmission distance is limited to several mms and is very sensitive to matching of the coils, and as a result, a degree of positional freedom is remarkably low.

The resonant magnetic coupling scheme as a technology proposed by Professor Marine Solarbeach of MIT in 2005 is a scheme that transmits energy by using a phenomenon in which the magnetic field concentrates on both sides of the transmitting side and the receiving side by the magnetic field applied at a resonance frequency between the coil at the transmitting side and the coil at the receiving side.

As a result, the resonant magnetic coupling scheme is expected as the wireless power transmission technology that can transmit energy up to a comparatively long distance from several cms to several ms as compared with the magnetic inductive coupling scheme to implement authentic cord-free.

However, in recent years, a recent wireless power transmission market has been crowded with various standards. Standards related with representative power transmission include individual standards including a WPC Qi standard, an A4WP standard lead by Qualcomm and Samsung, a PMA standard lead by Powermat, and the like. Under such a situation, there is a problem in that a wireless power transmission service cannot be achieved between a wireless power transmitting apparatus and a wireless power receiving apparatus that follow different standards.

SUMMARY OF THE INVENTION

An object of the present invention is to provide a wireless power transmitting apparatus and a wireless power transmitting method that supply wireless power to a plurality of wireless power receiving apparatuses using different wireless power transceiving schemes.

Effects of the present invention are not limited to the aforementioned effects and unmentioned effects will be clearly understood by those skilled in the art from the specification and the appended claims.

In accordance with an embodiment of the present invention, a wireless power transmitting apparatus includes: a power transmitting module transmitting wireless power by using a magnetic field of any one frequency band of a plurality of predetermined frequency bands; a communication module performing communication with a wireless power receiving apparatus; and a controller receiving a plurality of device profiles reflecting a frequency band used by a plurality of wireless power receiving apparatuses for transceiving the wireless power from the plurality of wireless power receiving apparatuses, respectively and configuring a power transmission mode based on the plurality of device profiles.

In accordance with another embodiment of the present invention, a wireless power transmitting method, including: receiving a plurality of device profiles reflecting a frequency band used by a plurality of wireless power receiving apparatuses for transceiving wireless power from the plurality of wireless power receiving apparatuses, respectively; and configuring a power transmission mode including a simultaneous mode of simultaneously transmitting the wireless power to the plurality of wireless power receiving apparatuses, a time division mode of transmitting the wireless power to the plurality of wireless power receiving apparatuses in a time division scheme, and a time division simultaneous mode of transmitting the wireless power to the plurality of wireless power receiving apparatuses simultaneously during a time-divided interval in a time division scheme based on the plurality of device profiles.

In accordance with yet another embodiment of the present invention, a wireless power transmitting apparatus, including: a power transmitting module transmitting wireless power by using a first magnetic field of a first frequency band or a second magnetic field of a second frequency band different from the first frequency band; and a controller sensing a wireless power receiving apparatus positioned in a wireless power transmission range, dividing a power transmission interval into a first time slot and a second time slot when at least one first wireless power receiving apparatus using the first magnetic field and at least one second wireless power receiving apparatus using the second magnetic field is positioned within the wireless power transmission range, supplying power to the at least one first wireless power receiving apparatus by transmitting the first magnetic field through the power transmitting module during the first time slot, and supplying the power to the at least one second wireless power receiving apparatus by transmitting the second magnetic field through the power transmitting module during the second time slot.

In accordance with still another embodiment of the present invention, a wireless power transmitting method by a wireless power transmitting apparatus transmitting wireless power by using a first magnetic field of a first frequency band or a second magnetic field of a second frequency band different from the first frequency band, including: sensing a wireless power receiving apparatus positioned in a wireless power transmission range; dividing a power transmission interval into a first time slot and a second time slot when at least one first wireless power receiving apparatus using the first magnetic field and at least one second wireless power receiving apparatus using the second magnetic field is positioned within the wireless power transmission range; supplying power to the at least one first wireless power receiving apparatus by transmitting the first magnetic field during the first time slot; and supplying power to the at least one second wireless power receiving apparatus by transmitting the second magnetic field during the second time slot.

Objects to be solved by the present invention are not limited to the aforementioned objects and unmentioned objects will be clearly understood by those skilled in the art from the specification and the appended claims.

According to the present invention, one wireless power transmitting apparatus can transmit power to a plurality of wireless power receiving apparatuses using different wireless power transceiving schemes.

Objects to be solved by the present invention are not limited to the aforementioned objects and unmentioned objects will be clearly understood by those skilled in the art from the specification and the appended claims.

DETAILED DESCRIPTION OF THE EMBODIMENTS

Figure 1:
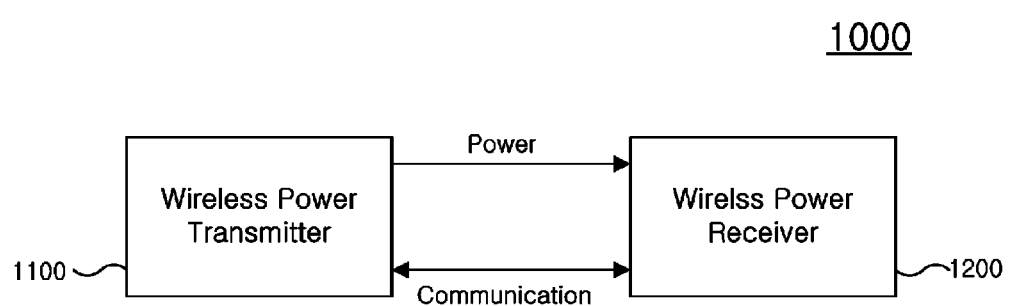
FIG. 1 is a block diagram of a wireless power system according to an embodiment of the present invention.

Since embodiments disclosed in the specification are used to clearly describe the spirit of the present invention for those skilled in the art, the present invention is not limited to the embodiments disclosed in the specification and it should be analyzed that the scope of the present invention includes a modified example and a transformed example without departing from the spirit of the present invention.

Terms and the accompanying drawings used in the specification are used to easily describe the present invention and shapes illustrated in the drawings may be enlarged as necessary for help understanding the present invention, and as a result, the present invention is not limited by the terms and the drawings used in the specification.

In describing the present invention, when it is determined that the detailed description of the known configuration or function related to the present invention may obscure the gist of the present invention, the detailed description thereof will be omitted.

In accordance with an embodiment of the present invention, a wireless power transmitting apparatus includes: a power transmitting module transmitting wireless power by using a magnetic field of any one frequency band of a plurality of predetermined frequency bands; a communication module performing communication with a wireless power receiving apparatus; and a controller receiving a plurality of device profiles reflecting a frequency band used by a plurality of wireless power receiving apparatuses for transceiving the wireless power from the plurality of wireless power receiving apparatuses, respectively and configuring a power transmission mode based on the plurality of device profiles.

The power transmission mode may include a simultaneous mode of simultaneously transmitting the wireless power to the plurality of wireless power receiving apparatuses, a time division mode of transmitting the wireless power to the plurality of wireless power receiving apparatuses in a time division scheme, and a time division simultaneous mode of transmitting the wireless power to the plurality of wireless power receiving apparatuses simultaneously during a time-divided interval in a time division scheme.

The controller may determine frequency bands which the plurality of wireless power receiving apparatuses uses for transmitting the wireless power based on the plurality of device profiles and configure the power transmission mode according to whether the frequency bands used by the plurality of wireless power receiving apparatuses are the same as or different from each other.

The controller may configure the power transmission mode as the time division mode or the time division simultaneous mode when two or more frequency bands for transceiving the wireless power are provided.

The device profile may include support mode information indicating a mode which the wireless power receiving apparatus supports between the time division mode and the simultaneous mode.

The controller may configure the power transmission mode based on the support mode information when all of the frequency bands for transceiving the wireless power are the same as each other.

When all of the frequency bands for transceiving the wireless power are the same as each other, the controller may configure the power transmission mode as the time division mode if the supported mode is the time division mode and as the simultaneous mode if the supported mode is the simultaneous mode.

The controller may configure the power transmission mode based on the support mode information when two or more frequency bands for transceiving the wireless power are provided.

When two or more frequency bands for transceiving the wireless power are provided, the controller may configure the power transmission mode as the time division mode if the supported mode is the time division mode and as the time division simultaneous mode if the supported mode is the simultaneous mode.

In accordance with another embodiment of the present invention, a wireless power transmitting method, including: receiving a plurality of device profiles reflecting a frequency band used by a plurality of wireless power receiving apparatuses for transceiving wireless power from the plurality of wireless power receiving apparatuses, respectively; and configuring a power transmission mode including a simultaneous mode of simultaneously transmitting the wireless power to the plurality of wireless power receiving apparatuses, a time division mode of transmitting the wireless power to the plurality of wireless power receiving apparatuses in a time division scheme, and a time division simultaneous mode of transmitting the wireless power to the plurality of wireless power receiving apparatuses simultaneously during a time-divided interval in a time division scheme based on the plurality of device profiles.

The configuring may include determining frequency bands which the plurality of wireless power receiving apparatuses uses for transmitting the wireless power based on the plurality of device profiles and configuring the power transmission mode according to whether the frequency bands used by the plurality of wireless power receiving apparatuses are the same as or different from each other.

In the configuring of the power transmission mode according to whether the frequency bands are the same as or different from each other, the power transmission mode may be configured as the time division mode or the time division simultaneous mode when two or more frequency bands for transceiving the wireless power are provided.

The device profile may include support mode information indicating a mode which the wireless power receiving apparatus supports between the time division mode and the simultaneous mode.

In the configuring of the power transmission mode according to whether the frequency bands are the same as or different from each other, the power transmission mode may be configured based on the support mode information when all of the frequency bands for transceiving the wireless power are the same as each other.

In the configuring of the power transmission mode according to whether the frequency bands are the same as or different from each other, when all of the frequency bands are the same as each other, the power transmission mode may be configured as the time division mode if the supported mode is the time division mode and the power transmission mode may be configured as the simultaneous mode if the supported mode is the simultaneous mode.

In the configuring of the power transmission mode according to whether the frequency bands are the same as or different from each other, the power transmission mode may be configured based on the support mode information when two or more frequency bands for transceiving the wireless power are provided.

In the configuring of the power transmission mode according to whether the frequency bands are the same as or different from each other, when two or more frequency bands for transceiving the wireless power are provided, the power transmission mode may be configured as the time division mode if the supported mode is the time division mode and the power transmission mode may be configured as the time division simultaneous mode if the supported mode is the simultaneous mode.

In accordance with yet another embodiment of the present invention, a wireless power transmitting apparatus, including: a power transmitting module transmitting wireless power by using a first magnetic field of a first frequency band or a second magnetic field of a second frequency band different from the first frequency band; and a controller sensing a wireless power receiving apparatus positioned in a wireless power transmission range, dividing a power transmission interval into a first time slot and a second time slot when at least one first wireless power receiving apparatus using the first magnetic field and at least one second wireless power receiving apparatus using the second magnetic field is positioned within the wireless power transmission range, supplying power to the at least one first wireless power receiving apparatus by transmitting the first magnetic field through the power transmitting module during the first time slot, and supplying the power to the at least one second wireless power receiving apparatus by transmitting the second magnetic field through the power transmitting module during the second time slot.

The wireless power transmitting apparatus may further include: a communication module performing communication with the wireless power receiving apparatus, wherein the controller transmits a first message indicating allocation of the first time slot to the first wireless power receiving apparatus through the communication module and a second message indicating allocation of the second time slot to the second wireless power receiving apparatus through the communication module.

The communication module may include a first communication module and a second communication module different from the first communication module in a frequency band or a communication carrier, and the controller may transmit the first message through the first communication module and the second message through the second communication module.

The first communication module may be an in-band communication module that performs communication by using the first magnetic field, and the second communication module may be an in-band communication module that performs communication by using the second magnetic field.

The first communication module may be the in-band communication module that performs communication by using the first magnetic field, and the second communication module may be an out-band communication module that performs communication by using the communication carrier other than the magnetic field.

The second communication module may support at least one communication protocol of Bluetooth, Zigbee, RFID, NFC, and WiFi.

The first wireless power apparatus may permit receiving the power in the first time slot and cut off receiving the power in the second time slot based on the first message, and the second wireless power apparatus may cut off receiving the power in the first time slot and permit receiving the power in the second time slot based on the second message.

The controller may transmit a notification message indicating the start of the time slot to the first wireless power receiving apparatus and the second wireless power receiving apparatus through the communication module when each time slot starts, and the first wireless power receiving apparatus and the second wireless power receiving apparatus may determine the start of the time slot based on the notification message and determine permitting and cutting off the reception of the power according to the determination result.

In accordance with still another embodiment of the present invention, a wireless power transmitting method by a wireless power transmitting apparatus transmitting wireless power by using a first magnetic field of a first frequency band or a second magnetic field of a second frequency band different from the first frequency band, including: sensing a wireless power receiving apparatus positioned in a wireless power transmission range; dividing a power transmission interval into a first time slot and a second time slot when at least one first wireless power receiving apparatus using the first magnetic field and at least one second wireless power receiving apparatus using the second magnetic field is positioned within the wireless power transmission range; supplying power to the at least one first wireless power receiving apparatus by transmitting the first magnetic field during the first time slot; and supplying power to the at least one second wireless power receiving apparatus by transmitting the second magnetic field during the second time slot.

The wireless power transmitting method may further include: transmitting a first message indicating allocation of the first time slot to the first wireless power receiving apparatus; and transmitting a second message indicating allocation of the second time slot to the second wireless power receiving apparatus.

The first message may be transmitted through a first communication module, and the second message may be transmitted through a second communication module different from the first communication module in a frequency band or a communication carrier.

The first communication module may be an in-band communication module that performs communication by using the first magnetic field, and the second communication module may be an in-band communication module that performs communication by using the second magnetic field.

The first communication module may be the in-band communication module that performs communication by using the first magnetic field, and the second communication module may be an out-band communication module that performs communication by using the communication carrier other than the magnetic field.

The second communication module may support at least one communication protocol of Bluetooth, Zigbee, RFID, NFC, and WiFi.

The first wireless power apparatus may permit receiving the power in the first time slot and cut off receiving the power in the second time slot based on the first message, and the second wireless power apparatus may cut off receiving the power in the first time slot and permit receiving the power in the second time slot based on the second message.

The wireless power transmitting method may further include: transmitting a notification message indicating the start of the time slot to the first wireless power receiving apparatus and the second wireless power receiving apparatus when each time slot starts, wherein the first wireless power receiving apparatus and the second wireless power receiving apparatus determine the start of the time slot based on the notification message and determine permitting and cutting off the reception of the power according to the determination result.

Hereinafter, a wireless power system 1000 according to an embodiment of the present invention will be described.

The wireless power system 1000 may wirelessly transmit power using a magnetic field.

FIG. 1 is a block diagram of a wireless power system 1000 according to an embodiment of the present invention.

Referring to FIG. 1, the wireless power system 1000 includes a wireless power transmitting apparatus 1100 and a wireless power receiving apparatus 1200. The wireless power transmitting apparatus 1100 receives power from an external power source S to generate the magnetic field. The wireless power receiving apparatus 1200 generates current by using the generated magnetic field to receive power wirelessly.

Further, in the wireless power system 1000, the wireless power transmitting apparatus 1100 and the wireless power receiving apparatus 1200 may transmit and receive various pieces of information required for the wireless power transmission. Herein communication between the wireless power transmitting apparatus 1100 and the wireless power receiving apparatus 1200 may be performed according to any one scheme of in-band communication using the magnetic field used for the wireless power transmission or out-band communication using a separate communication carrier.

Herein, the wireless power transmitting apparatus 1100 may be provided as a fixed type or a movable type. An example of the fixed type includes a type which is embedded in a ceiling or a wall surface or a furniture such as a table, or the like indoor, a type which is installed in an outdoor parking lot, a bus stop, or a subway station as an implant type, or a type which is installed in transporting means such as a vehicle or a train. The movable wireless power transmitting apparatus 1100 may be implemented as a part of a movable apparatus having a movable weight or size or other apparatus such as a cover of a notebook computer, or the like.

Further, the wireless power receiving apparatus 1200 should be analyzed as a comprehensive concept including various electronic apparatuses including a battery and various home appliances driven by receiving power wirelessly instead of a power cable. Representative examples of the wireless power receiving apparatus 1200 include a portable terminal, a cellular phone, a smart phone, a personal digital assistant (PDA), a portable media player (PMP), a Wibro terminal, a tablet, a pablet, a notebook, a digital camera, a navigation terminal, a television, an electric vehicle (EV), and the like. Electronic Vehicle) One or more wireless power receiving apparatuses 1200 may be present in the wireless power transmitting system 1000. In FIG. 1, it is expressed that the wireless power transmitting apparatus 1100 and the wireless power receiving apparatus 1200 transmit and receive power one to one, but one wireless power transmitting apparatus 1100 may transmit power to the plurality of wireless power receiving apparatuses 1200. In particular, when the wireless power transmission is performed in the resonant magnetic coupling scheme, one wireless power transmitting apparatus 1100 may transmit power to a plurality of wireless power receiving apparatuses 1200 simultaneously by applying a simultaneous transmission scheme or a time division transmission scheme.

Meanwhile, although not illustrated in FIG. 1, the wireless power transmitting system 1000 may further include a relay for increasing a power transmission distance. As the relay, a passive type resonance loop implemented by an LC circuit may be used. The resonance loop may increase the wireless power transmission distance by focusing a magnetic field radiated to the atmosphere. It is possible to secure wider wireless power transmission coverage by simultaneously using a plurality of relays.

Hereinafter, the wireless power transmitting apparatus 1100 according to the embodiment of the present invention will be described.

The wireless power transmitting apparatus 1100 may transmit power wirelessly.

Figure 2:
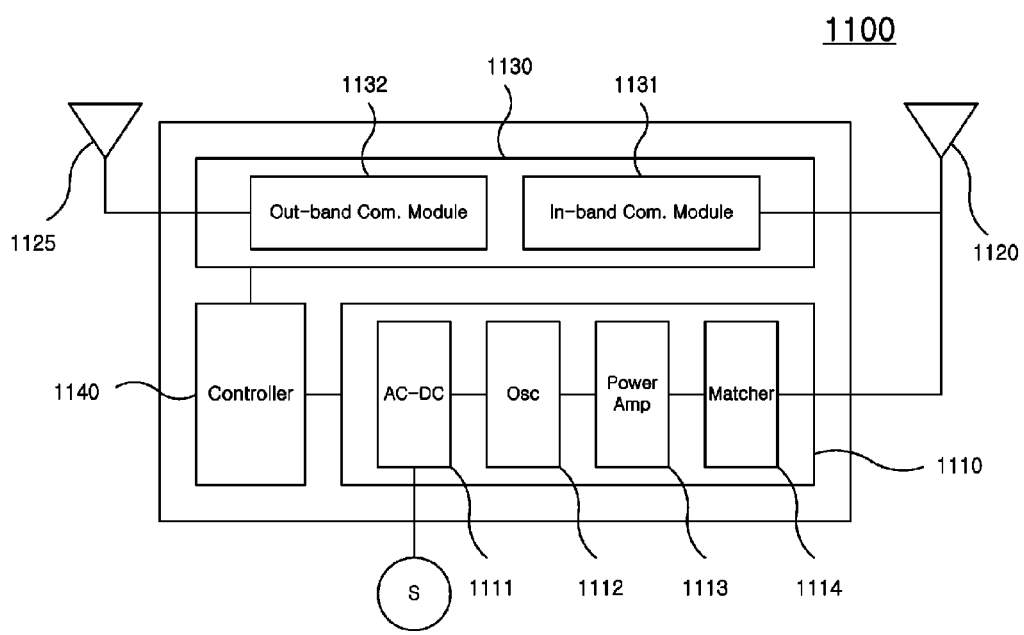
FIG. 2 is a block diagram of a wireless power transmitting apparatus according to an embodiment of the present invention.

FIG. 2 is a block diagram of the wireless power transmitting apparatus 1100 according to an embodiment of the present invention.

Referring to FIG. 2, the wireless power transmitting apparatus 1100 may include a power transmitting module 1110, a transmitting antenna 1120, a communication module 1130, and a controller 1140.

The power transmitting module 1110 may generate transmission power by using the power applied from the external power source S. The power transmitting module 1110 may include an AC-DC converter 1111, a frequency oscillator 1112, a power amplifier 1113, and an impedance matcher 1114.

The AC-DC converter 1111 may convert AC power into DC power. The AC-DC converter 1111 receives the AC power from the external power source S and converts a wavelength of the received AC power into the DC power and outputs the DC power. The AC-DC converter 1111 may adjust a voltage value of the output DC power.

The frequency oscillator 1112 may convert the DC power into AC power having a desired specific frequency. The frequency oscillator 1112 receives the DC power output by the AC-DC converter 1111 and converts the received DC power into AC power having a specific frequency and outputs the AC power. Herein, the specific frequency may be a resonance frequency. In this case, the frequency oscillator 1112 may output the AC power having the resonance frequency. Of course, the frequency oscillator 1112 needs not particularly oscillate the resonance frequency.

The power amplifier 1113 may amplify voltage or current of power. The power amplifier 1113 receives the AC power having the specific frequency, which is output by the oscillator 1112, and amplifies voltage or current of the received AC power having the specific frequency and outputs the amplified voltage or current.

The impedance matcher 1114 may perform impedance matching. The impedance matcher 1114 may include a capacitor, an inductor, and a switching element that switches a connection thereof. Impedance matching may be performed by detecting a reflection wave of the wireless power transmitted through the receiving antenna 1120, adjusting a connection state of the capacitor or the inductor by switching the switching element based on the detected reflection wave, or adjusting capacitance of the capacitor or inductance of the inductor.

The transmitting antenna 1120 may general an electromagnetic field by using the AC power. The transmitting antenna 1120 receives the AC power having the specific frequency, which is output by the amplifier 1113 to thereby generate a magnetic field having a specific frequency. The generated magnetic field is radiated and the wireless power receiving apparatus 1200 receives the radiated magnetic field to generate current. In other words, the transmitting antenna 1120 wirelessly transmits power.

The communication antenna 1125 may transmit and receive a communication signal by using a communication carrier other than magnetic field communication. For example, the communication antenna 1125 may transmit and receive communication signals such as Wi-Fi, Bluetooth, Bluetooth LE, ZigBee, NFC, and the like.

The communication module 1130 may transmit and receive information to and from the wireless power receiving apparatus 1200. The communication module 1130 may include an in-band communication module 1131 and an out-band communication module 1132.

The in-band communication module 1131 may transmit and receive information by using a magnetic wave having a specific frequency as a center frequency. For example, the communication module 11230 transmits the magnetic information loaded with the magnetic wave through the transmitting antenna 1120 or receives the magnetic wave including the information through the transmitting antenna 1120 to perform the in-band communication. In this case, the information may be loaded on the magnetic wave or the magnetic wave including the information may be analyzed by using a modulation scheme such as binary phase shift keying (BPSK) or amplitude shift keying (ASK) and a coding scheme such as Manchester coding or non-return-to-zero level (NZR-L) coding. When the in-band communication is used, the communication module 1130 may transmit and receive the information up to a distance of several meters at data transmission rate of several kbps.

The out-band communication module 1132 may perform the out-band communication through the communication antenna 1125. For example, the communication module 1130 may be provided as a short-range communication module. Examples of the short-range communication module may include communication modules such as the Wi-Fi, the Bluetooth, the Bluetooth LE, the ZigBee, the NFC, and the like.

The controller 1140 may control all motions of the wireless power transmitting apparatus 1100. The controller 1140 may calculate and process various pieces of information and control respective components of the wireless power transmitting apparatus 1100.

The controller 1140 may be implemented as a computer or an apparatus similar thereto according to hardware, software, or a combination thereof. The controller 1140 may be provided in a form of an electronic circuit that performs a control function by processing an electric signal in terms of the hardware in a form of a program that drives the hardware controller 1150 which is the hardware in terms of the software.

Hereinafter, the wireless power receiving apparatus 1200 according to the embodiment of the present invention will be described.

The wireless power receiving apparatus 1200 may receive power wirelessly.

Figure 3:
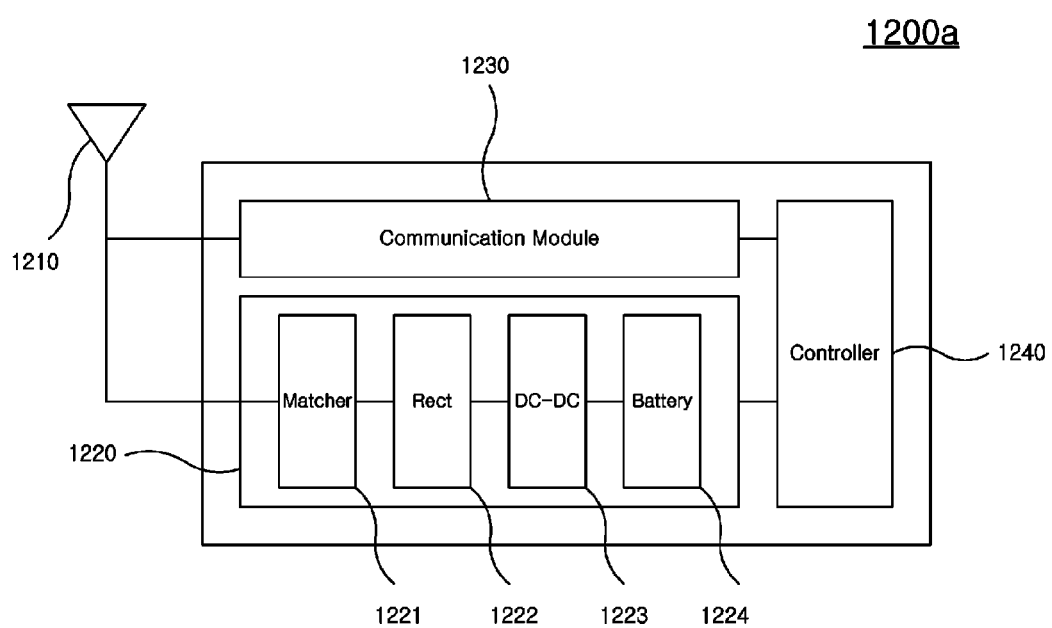
FIG. 3 is a block diagram of a first form of a wireless power receiving apparatus according to an embodiment of the present invention.

FIG. 3 is a block diagram of a first form of the wireless power receiving apparatus 1200 according to an embodiment of the present invention.

Referring to FIG. 3, the wireless power receiving apparatus 1200 may include a receiving antenna 1210, a power receiving module 1220, a communication module 1230, and a controller 1240.

The receiving antenna 1210 may receive the wireless power transmitted by the wireless power transmitting apparatus 1100. The receiving antenna 1210 may receive power by using the magnetic field radiated by the transmitting antenna 1120. Herein, when a specific frequency is the resonance frequency, a magnetic resonance phenomenon occurs between the transmitting antenna 1120 and the receiving antenna 1210, and as a result, power may be more efficiently received.

The power receiving module 1220 may charge or drive the wireless power receiving apparatus 1200 by using the power received by the receiving antenna 1210. The power receiving module 1220 may include an impedance matcher 1221, a rectifier 1222, a DC-DC converter 1223, and a battery 1224.

The impedance matcher 1221 may adjust impedance of the wireless power receiving apparatus 1200. The impedance matcher 1221 may include a capacitor, an inductor, and a switching element that switches a connection thereof. The impedance may be matched by controlling a switching element of a circuit constituting the impedance matcher 1221 based on a voltage value or a current value, a power value, a frequency value, and the like of the received wires power.

The rectifier 1222 rectifies the received wireless power to convert AC power to DC power. The rectifier 1222 may convert the AC power into the DC power by using a diode or a transistor and smooth the DC power by using the capacitor or a resistor. As the rectifier 1222, a full-wave rectifier, a half-wave rectifier, a voltage multiplier, and the like implemented by a bridge circuit, and the like may be used.

The DC-DC converter 1223 converts voltage of the rectified DC power into a desired level to output the voltage having the desired level. When a voltage value of the DC power rectified by the rectifier 1222 is larger or smaller than a voltage value required to charge the battery or drive the electronic apparatus, the DC-DC converter 1223 may change the voltage value of the rectified DC power to desired voltage.

The battery 1224 may store energy by using the power output from the DC-DC converter 1223. Meanwhile, the wireless power receiving apparatus 1200 need not particularly include the battery 1224. For example, the battery may be provided as an external component which is detachable. As another example, the wireless power receiving apparatus 1200 may include driving means that drives various operations of the electronic apparatus instead of the battery 1224.

The communication module 1230 may transmit and receive information to and from the wireless power transmitting apparatus 1200. In a first form of the wireless power receiving apparatus 1200, the communication module 1230 may perform the in-band communication.

The in-band communication type communication module 1230 may transmit and receive information by using a magnetic wave having a specific frequency as a center frequency. For example, the communication module 1230 transmits the magnetic wave loaded with the information through the receiving antenna 1210 or receives the magnetic wave including the information through the receiving antenna 1210 to perform the in-band communication. In this case, the information may be loaded on the magnetic wave or the magnetic wave including the information may be analyzed by using the modulation scheme such as the binary phase shift keying (BPSK) or amplitude shift keying (ASK) and the coding scheme such as the Manchester coding or non-return-to-zero level (NZR-L) coding. When the in-band communication is used, the communication module 1230 may transmit and receive the information up to a distance of several meters at data transmission rate of several kbps.

The controller 1240 may control all motions of the wireless power receiving apparatus 1200. The controller 1240 may calculate and process various pieces of information and control respective components of the wireless power receiving apparatus 1200.

The controller 1240 may be implemented as the computer or the apparatus similar thereto according to the hardware, the software, or the combination thereof. The controller 1240 may be provided in a form of an electronic circuit that performs a control function by processing an electric signal in terms of the hardware and in a form of a program that drives the hardware controller 1240 which is the hardware in terms of the software.

Figure 4:
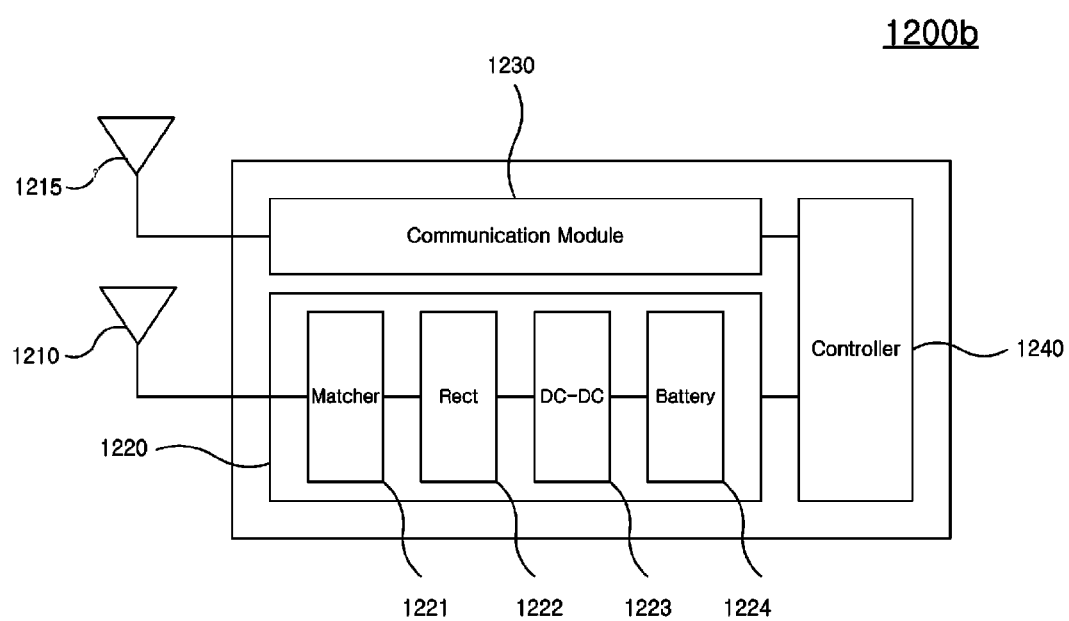
FIG. 4 is a block diagram of a second form of a wireless power receiving apparatus according to an embodiment of the present invention.

FIG. 4 is a block diagram of a second form of the wireless power receiving apparatus 1200 according to an embodiment of the present invention.

Referring to FIG. 4, the second-form wireless power receiving apparatus 1200 may additionally include the communication antenna 1215 to the configuration of the first-form wireless power receiving apparatus 1200. Further, in the second-form wireless power receiving apparatus 1200, the communication module 1230 may be the out-band type communication module.

The communication antenna 1215 may transmit and receive the communication signal by using the communication carrier other than the magnetic field communication. For example, the communication antenna 1215 may transmit and receive the communication signals such as the Wi-Fi, the Bluetooth, the Bluetooth LE, the ZigBee, the NFC, and the like.

The communication module 1230 as the out-band communication module may perform the out-band communication through the communication antenna 1215. For example, the communication module 1130 may be provided as the short-range communication module. An example of the short-range communication module may include communication modules including the Wi-Fi, the Bluetooth, the Bluetooth LE, the ZigBee, the NFC, and the like.

Therefore, in the second form of the wireless power receiving apparatus 1200, the wireless power may be received through the receiving antenna 1210 and communication with the wireless power transmitting apparatus 1100 may be achieved through the communication antenna 1215.

Hereinafter, a process in which the power is wirelessly transmitted in the wireless power transmitting system 1000 according an embodiment of the present invention will be described.

Wireless transmission of the power may be performed by using the electromagnetic inductive coupling scheme or the resonant magnetic coupling scheme. In this case, the wireless transmission of the power may be performed between the transmitting antenna 1120 of the wireless power transmitting apparatus 1100 and the receiving antenna 1210 of the wireless power receiving apparatus 1200.

When the resonant magnetic coupling scheme is used, each of the transmitting antenna 1120 and the receiving antenna 1210 may be provided in a form of a resonance antenna. The resonance antenna may have a resonance structure including the coil and the capacitor. In this case, the resonance frequency of the resonance antenna is determined by the inductance of the coil and the capacitance of the capacitor. Herein, the coil may be formed in a form of a loop. Further, a core may be placed in the loop. The core may include a physical core such as a ferrite core or an air core.

Energy transmission between the transmitting antenna 1120 and the receiving antenna 1210 may be performed through a resonance phenomenon of the magnetic field. The resonance phenomenon means a phenomenon in which both resonance antennas are coupled to each other, and as a result, energy is transferred between the resonance antennas with high efficiency in the case where other resonance antennas are positioned around one resonance antenna when a near field corresponding to the resonance frequency is generated in one resonance antenna. When the magnetic field corresponding to the resonance frequency is generated between the resonance antenna of the transmitting antenna 1120 and the resonance antenna of the receiving antenna 1210, the resonance phenomenon occurs, in which the resonance antennas of the transmitting antenna 1120 and the receiving antenna 1210, and as a result, in a general case, the magnetic field is focused toward the receiving antenna 1210 with higher efficiency than a case in which the magnetic field generated in the transmitting antenna 1120 is radiated to free space. Therefore, energy may be transferred from the transmitting antenna 1120 to the receiving antenna 1210 with high efficiency.

The electromagnetic inductive coupling scheme may be implemented similarly to the resonance magnetic coupling scheme, but in this case, the frequency of the magnetic field need not be the resonance frequency. Instead, in the electromagnetic inductive coupling scheme, matching the loops constituting the receiving antenna 1210 and the transmitting antenna 1120 is required and a gap between the loops needs to be very small.

Hereinafter, a wireless power network 2000 will be described.

The wireless power network 2000 may mean a network that performs wireless power transmission and communication.

Figure 5:
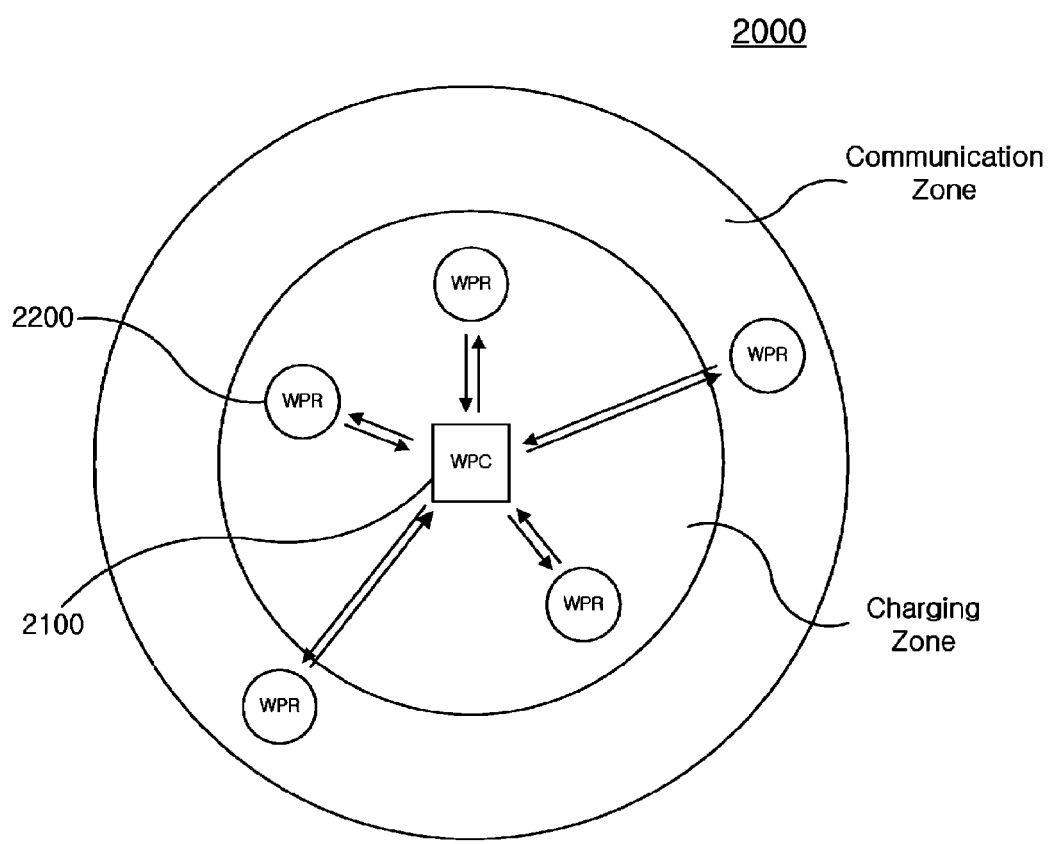
FIG. 5 is a schematic diagram regarding communication in a wireless power network according to an embodiment of the present invention.
Figure 6:
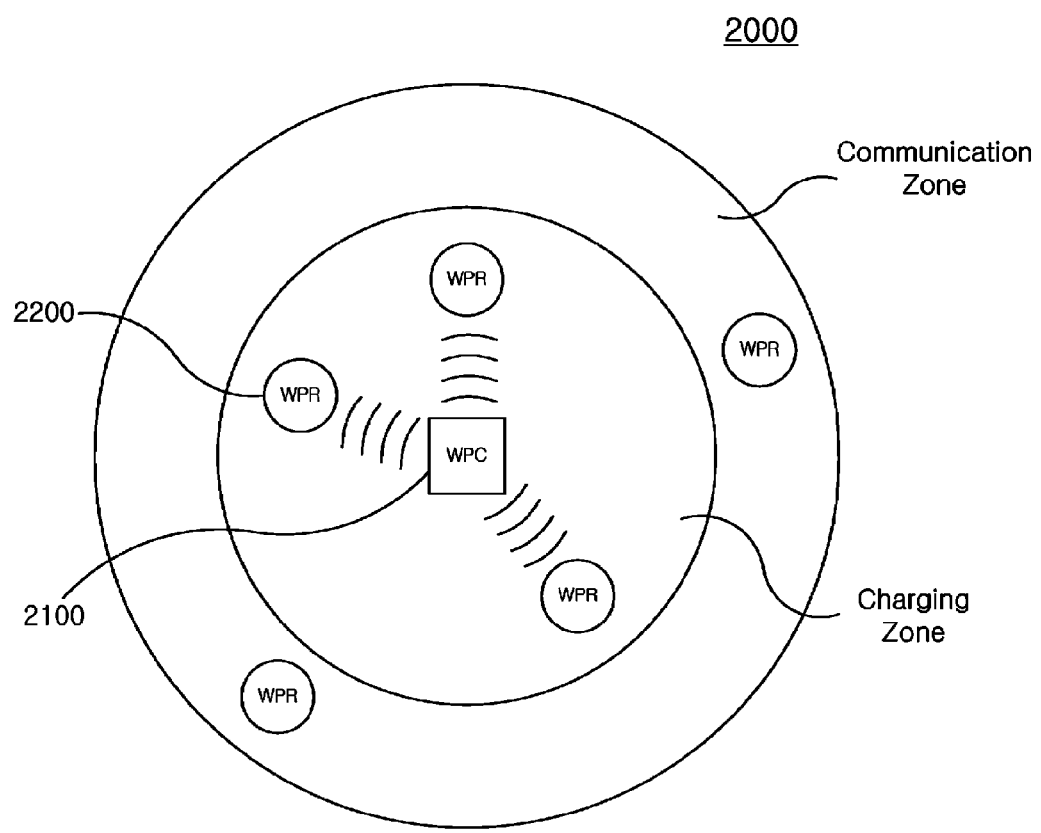
FIG. 6 is a schematic diagram regarding wireless power transmission in a wireless power network according to an embodiment of the present invention.

FIG. 5 is a schematic diagram regarding communication in a wireless power network 2000 according to an embodiment of the present invention. FIG. 6 is a schematic diagram regarding wireless power transmission in a wireless power network 2000 according to an embodiment of the present invention.

Referring to FIGS. 5 and 6, the wireless power network 2000 may include a wireless power charger (WPC, hereinafter, referred to as 'charger') 2100 and a wireless power receiver (WPR, hereinafter, referred to as 'receiver') 2200. Herein, the charger 2100 may be provided as an apparatus that performs a function which is the same as or similar to the wireless power transmitting apparatus 1100 or the wireless power transmitting apparatus 1100. Further, the receiver 2200 may be provided as the first form or second form of the wireless power receiving apparatus 1200 or an apparatus that performs a function which is the same thereas or similar thereto.

Accordingly, hereinafter, motions performed by the charger 2100 may be performed by the respective components of the wireless power transmitting apparatus 1100 and motions performed by the receiver 2200 may be performed by the respective components of the wireless power receiving apparatus 1200. For example, communication between the charger 2100 and the receiver 2200 may be performed by the communication modules 1131 and 1230 in the in-band communication scheme through the transmitting antenna 1120 and the receiving antenna 1210 or performed by the communication modules 1132 and 1230 in the out-band communication scheme through the communication antennas 1125 and 1215. Further, the transmission and reception of the wireless power may be performed by the power transmitting module 1110 and the power receiving module 1220 in the resonance magnetic coupling scheme or the electromagnetic inductive coupling scheme through the transmitting antenna 1120 and the receiving antenna 1210. In addition, similarly thereto, various control and calculation including control of selection of a power transmission mode or allocation of a time slot, or activation and deactivation of the receiver 2200 may be performed by the controllers 1140 and 1240.

The wireless power network 2000 may be provided a start topology form in which one or more receivers 2200 are deployed around the charger 2100. The charger 2100 may radiate the magnetic field to the periphery thereof. As a result, a communication zone and a charging zone may be formed around the charger 2100.

Herein, the communication zone means a zone in which the charger 2100 is communicatable with the receiver 2200 and the charging zone means a zone in which the receiver 2200 may actually charge the battery by using the magnetic field received from the charger 2100 and the receiver 2200 may be driven.

The communication zone may include the charging zone therein. For example, when the communication is performed by the in-band scheme in the wireless power network 2000, the communication zone may be a range in which a communication packet may be transmitted to and received from the receiver 2200 by the magnetic field radiated from the charger 2100 and the charging zone may be a range in which sufficient power may be transferred for driving the receiver 2200 or charging the battery by the magnetic field radiated from the charger 2100. The power transferred by the magnetic field radiated from the charger 2100 decreases as a distance increases and predetermined power or more needs to be transferred by the magnetic field in order to charge or drive the receiver 2200, while since the constraint is comparatively weak in the transmission and reception of the packet in the magnetic field communication, the charging zone is smaller than the communication zone. Of course, the communication zone and the charging zone may coincide with each other. Meanwhile, when the communication is performed in the out-band type, a range of a short-range communication network is generally larger than a distance of the wireless power transmission, and as a result, the communication zone may be formed to be larger than the charging zone.

Whether the receiver 2200 belongs to the charging zone or the communication zone other than the charging zone may be determined according to whether the receiver 2200 may be normally charged (alternatively, drive). For example, the charger 2100 may determine whether the receiver 2200 may be normally charged based on a strength of a magnetic field signal received from the receiver 2200. Alternatively, it may determined whether the receiver 2200 may be normally charged based on the strength of the magnetic field signal radiated from the charger 2100 and the result may be transmitted to the charger 2100.

Referring back to FIG. 5, the charger 2100 transmits and receives the magnetic field signal or the communication carrier according to the out-band communication to and from the receiver 2200 in the communication zone including the charging region. Further, referring to FIG. 6, the charger 2100 may perform the wireless power transmission using the magnetic field to the receiver 2200 positioned in the charging zone among the receivers 2200.

Meanwhile, in FIGS. 5 and 6, it is illustrated that the charging zone and the communication zone are spatially accurately distinguished while drawing a concentric circle. For example, a larger charging zone may be provided to a receiver 2200 having lower charging voltage of the battery than a receiver 2200 having higher charging voltage.

Hereinafter, a method for transceiving wireless power according to an embodiment of the present invention will be described. The wireless power transceiving method will be described by using the wireless power network 2000. However, the wireless power transceiving method is not limited thereto and may be performed by another system similar thereto.

Figure 7:
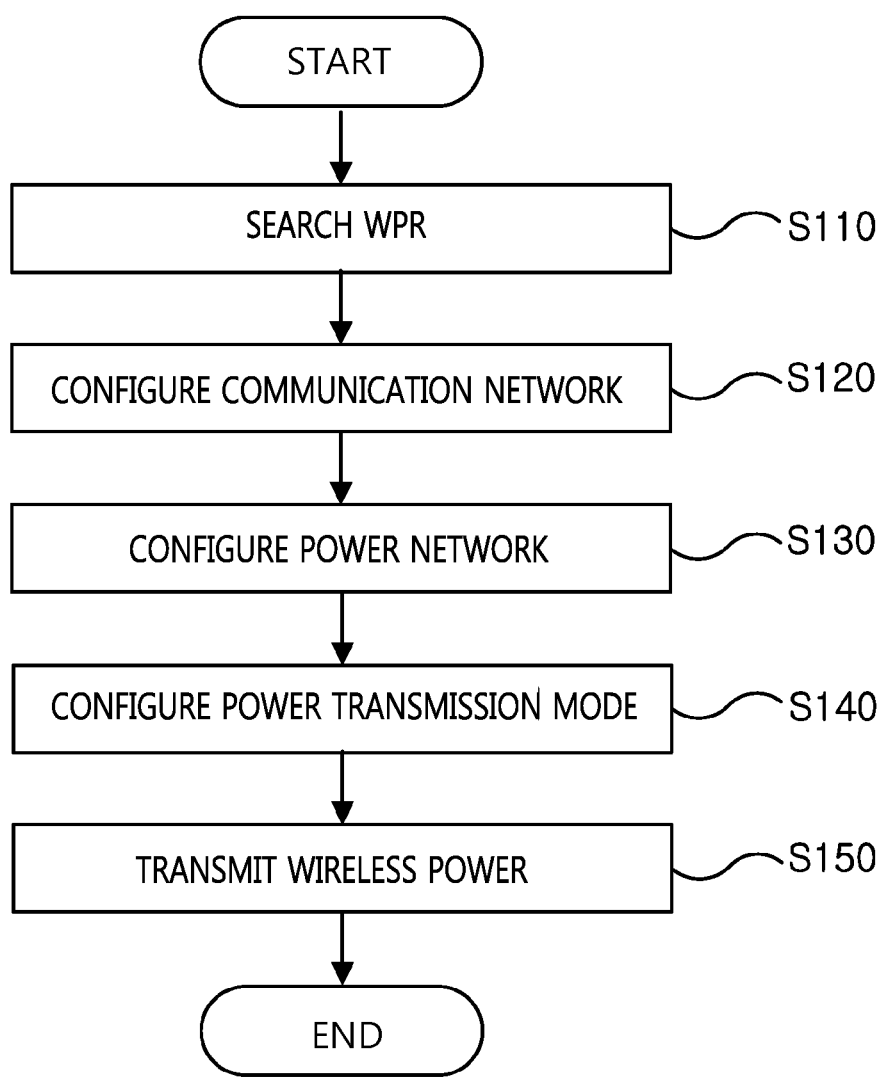
FIG. 7 is a flowchart of a wireless power transceiving method according to an embodiment of the present invention.

FIG. 7 is a flowchart of a method for transceiving wireless power according to an embodiment of the present invention.

Referring to FIG. 7, the method for transceiving wireless power may include searching a receiver 2200 (S110), configuring a communication network (S120), configuring a power network (S130), configuring a power transmission mode (S140), and transceiving the wireless power (S150). Hereinafter, the aforementioned respective steps will be described in more detail.

First, a charger 2100 may search the receiver 2200 positioned therearound (S110).

Herein, the receiver 2200 may transceive the wireless power according to various wireless power transceiving protocols. For example, the receiver 2200 may operate according to a wireless power transceiving protocol or a communication protocol defined in at least one standard of a Qi standard of Wireless Power Consortium (WPC), a wireless power transceiving standard of Alliance For Wireless Power (A4WP), a wireless power transceiving standard of Power Matteres Alliance (PMA), a wireless power transceiving standard lead by near field communication (NFC) or radio frequency identification (RFID), ISO/IEC SC6, ISO TC100, CJK wireless power transmission standard, and various other domestic standards, an international standard, and an industrial standard.

The charger 2100 may perform communication and power transceiving according to a scheme defined by a plurality of standards among the various standards. As a result, the charger 2100 may search receivers 2200 according to different standards.

The charger 2100 may periodically broadcast a scanning signal according to the plurality of standards. Various communication carriers in various frequency bands may be used for the scanning signal. In detail, in the case of the Qi standard, a magnetic field signal in a specific frequency band is transmitted in order to search the surrounding receiver 2200 and in the case of the A4WP standard, a magnetic field signal in another frequency band is transmitted in order to search the surrounding receiver 2200.

Each receiver 2200 may transmit a response signal in response to the scanning signal according to the standard scheme applied to the corresponding receiver 2200 to the charger 2100. The charger 2100 analyzes the response signal to determine with which standard there is a receiver 2200 applied therearound.

Figure 8:
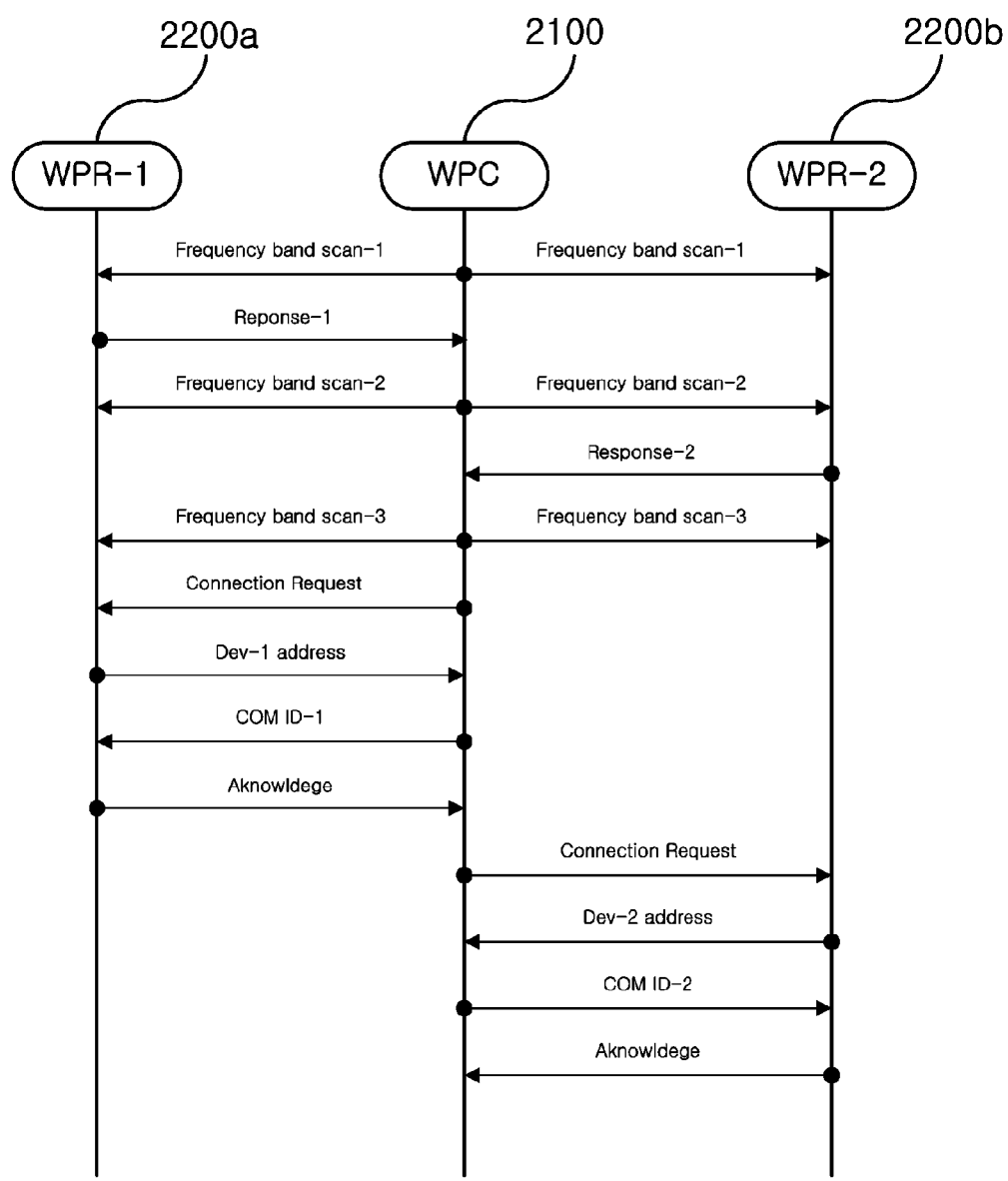
FIG. 8 is a detailed flowchart of steps constituting a communication network in the wireless power transceiving method according to the embodiment of the present invention.

In detail, the method that searched the receiver 2200 will be described with reference to FIG. 8. FIG. 8 is a detailed flowchart of the step of configuring the communication in the method for transceiving wireless power according to the embodiment of the present invention.

Herein, the charger 2100 is an apparatus that may perform transceive the wireless power according to a first standard, a second standard, and a third standard. A first receiver (WPR-1) 2200a is an apparatus applied with the first standard regarding the wireless power transceiving and a second receiver (WPR-2) 2200b is an apparatus applied with the second standard regarding the wireless power transceiving.

Referring to FIG. 8, the charger 2100 may sequentially broadcast a first scanning signal according to the first standard, a second scanning signal according to the second standard, and a third scanning signal according to the third standard. Herein, the first scanning signal, the second scanning signal, and the third scanning signal as signals defined by different standards may be different from each other in at least one of the communication frequency or the communication carrier. For example, the first scanning signal may be a magnetic field signal in a band of 100 to 200 KHz, the second scanning signal may be a magnetic field signal in a range of 6.78 MHz, and the third scanning signal may be an RFID signal.

The charger 2100 may transmit the respective scanning signals and receive response signals according to the corresponding standards for a predetermined time. In this case, the first receiver 2200a transmits a first response signal according to the first standard to the charger 2100 in response to the first scanning signal. Similarly, the second receiver 2200b transmits a second response signal according to the second standard to the charger 2100 in response to the second scanning signal. Further, the first receiver 2200a and the second receiver 2200b do not respond to the third scanning signal according to the third standard. Herein, the first response signal and the second response signal have the frequencies and the communication carriers, respectively.

When the charger 2100 receives the first response signal and the second response signal, the charger 2100 may determine that there is the first receiver 2200a according to the first standard therearound according to the first response signal and determine that there is the second receiver 2200b according to the second standard according to the response signal. Further, the charger 2100 may determine the standards applied to the surrounding receivers 2200 according to each response signal.

The charger 2100 may search the surrounding receiver 2200 through the aforementioned process.

Meanwhile, as the charger 2100 receives the response signal, the charger 2100 determines the presence of the receiver 2200 hereinabove, but unlike this, the charger 2100 may determine the presence of the receiver 2200 and the standard used by the receiver 2200 by detecting a change in impedance or a reflection wave of the scanning signal when transmitting the scanning signal. Even in this case, the magnetic field is used as a carrier of the scanning signal and the process of receiving the response signal may be omitted.

The charger 2100 may configure the communication network (S120). In detail, the charger 2100 may join the searched receivers 2200 in the communication network.

The charger 2100 may transmit access request messages to the searched receivers 2200. In this case, the access request message transmitted to each receiver 2200 may be a signal according to a standard which the receiver 2200 is determined to use during detecting the receiver 2200. When the receiver 2200 receives the access request message, the receiver 2200 may transmit an access response message including identification information (for example, an apparatus address such as an MAC address) of the receiver 2200 in response thereto. Herein, the access response message may be an in-band communication signal or an out-band communication signal having a frequency band according to the corresponding standard as a signal defined in the standard applied to the corresponding receiver 2200.

The charger 2100 may allocate a communication ID COM to each receiver 2200 based on the response signal and transmit a communication network configuration message including the communication ID to each receiver 2200. The receiver 2200 may recognize an ID thereof based on the communication ID included in the communication network configuration message and transmit a verification message to the charger 2100.

In detail, the method that configures the communication network will be described by referring back to FIG. 8.

Referring to FIG. 8, the charger 2100 transmits a first access request message to the first receiver 2200*a*. The first receiver 2200*a* may transmit a first access response message including identification information of the first receiver 2200*a* to the charger 2100 in response thereto. The charger 2100 allocates a first communication ID COM-1 to the first receiver 2200*a* based on the identification information and transmits a communication network configuration message including the first communication ID COM-1 to the first receiver 2200*a*. The first receiver 2200*a* sets the first communication ID COM-1 as a communication ID thereof and transmits the verification message to the charger 2100.

When setting the communication ID of the first receiver 2200*a* is terminated, the charger 2100 transmits a second access request message to the second receiver 2200*b*. The second receiver 2200*b* may transmit a second access response message including identification information of the second receiver 2200*b* to the charger 2100 in response thereto. The charger 2100 allocates a second communication ID COM-2 to the second receiver 2200*b* based on the identification information and transmits a communication network configuration message including the second communication ID COM-2 to the second receiver 2200*b*. The second receiver 2200*b* sets the second communication ID COM-2 as a communication ID thereof and transmits the verification message to the charger 2100.

Herein, a message used for the configuration of the communication network may be implemented in a message format defined in the standard by the corresponding receiver 2200 for each receiver 2200 corresponding to the message. Since the charger 2100 may determine which each receiver uses in the step of searching the receiver 2200, the charger 2100 may determine a format of a message which each receiver 2200 will transmit and receive based on the determination.

That is, the first access request message and the first access response message may be provided as signals of the frequency band and the carrier according to the first standard, respectively and the second access request message and the second access response message may be provided as signals of the frequency band and the carrier according to the second standard, respectively. Therefore, the first access request message and the first access response message and the second access request message and the second access response message may be different from each other in at least one of the frequency band, the communication scheme (in-band or out-band), and the communication carrier.

Further, similarly, the communication network configuration message and the verification message which the charger 2100 transmits and receives to and from the first receiver 2200*a* and the communication network configuration message and the verification message which the charger 2100 transmits and receives to and from the second receiver 2200*b* as the signals according to the first standard and the second standard, respectively may be different from each other in at least one of the frequency band, the communication scheme, and the communication carrier.

As a result, the communication ID is allocated to each receiver 2200 to configure the communication network. When configuring the communication network is completed, the charger 2100 may perform communication with each receiver 2200 by using the communication ID allocated to each receiver 2200 in configuring the communication network.

When configuring of the communication network is completed, the charger 2100 may configure the power network (S130).

The charger 2100 may transmit and receive a device profile request message to the receiver 2200. The receiver 2200 may transmit to a device profile response message including a device profile in response thereto. Herein, the device profile may include information regarding a standard used for the wireless power transceiving of the receiver 2200, information regarding a standard used for the communication, a type (a simultaneously mode, a time division mode, and a time-division simultaneous mode of a scheme in which the simultaneously mode and the time division mode are combined) of a power transceiving mode, a type (for example, distinguishment of a picture phone, a smart phone, a tablet, and the like) of the receiver 2200, a power value (voltage or current) for charging the battery, a battery state (whether full discharging, full charging, and what percentage the battery is charged with), and the like.

The charger 2100 may determine whether the wireless power transmission scheme supported by the charger 2100 and the wireless power transmission scheme applied to the receiver 2200 are compatible with each other based on the device profile. For example, when the charger 2100 supports the wireless power transmission according to the Qi standard and the A4WP standard, in the case where the receiver 2200 may receive the wireless power according to any one standard of both standards, the charger 2100 may determine that the receiver 2200 is compatible. On the contrary, when the charger 2100 supports the wireless power transmission according to the Qi standard and the A4WP standard, in the case where the receiver 2200 may receive the wireless power according to the PMA standard, the charger 2100 may determine that the receiver 2200 is not compatible.

The charger 2100 allocates a power ID (WPT-ID) to the receiver 2200 when the receiver is compatible and transmits a power network configuration message including the power ID to the receiver 2200. The receiver 2200 may recognize the power ID thereof based on the received power network configuration message and transmit the verification message to the charger 2100.

Meanwhile, the charger 2100 may transmit a message indicting that the compatibility is impossible to the receiver 2200 when the compatibility is impossible and the receiver 2200 may transmit the verification message for the transmitted message to the charger 2100. Thereafter, the receiver 2200 which is not compatible may not receive the power in the wireless power transmitting step (S140).

Figure 9:
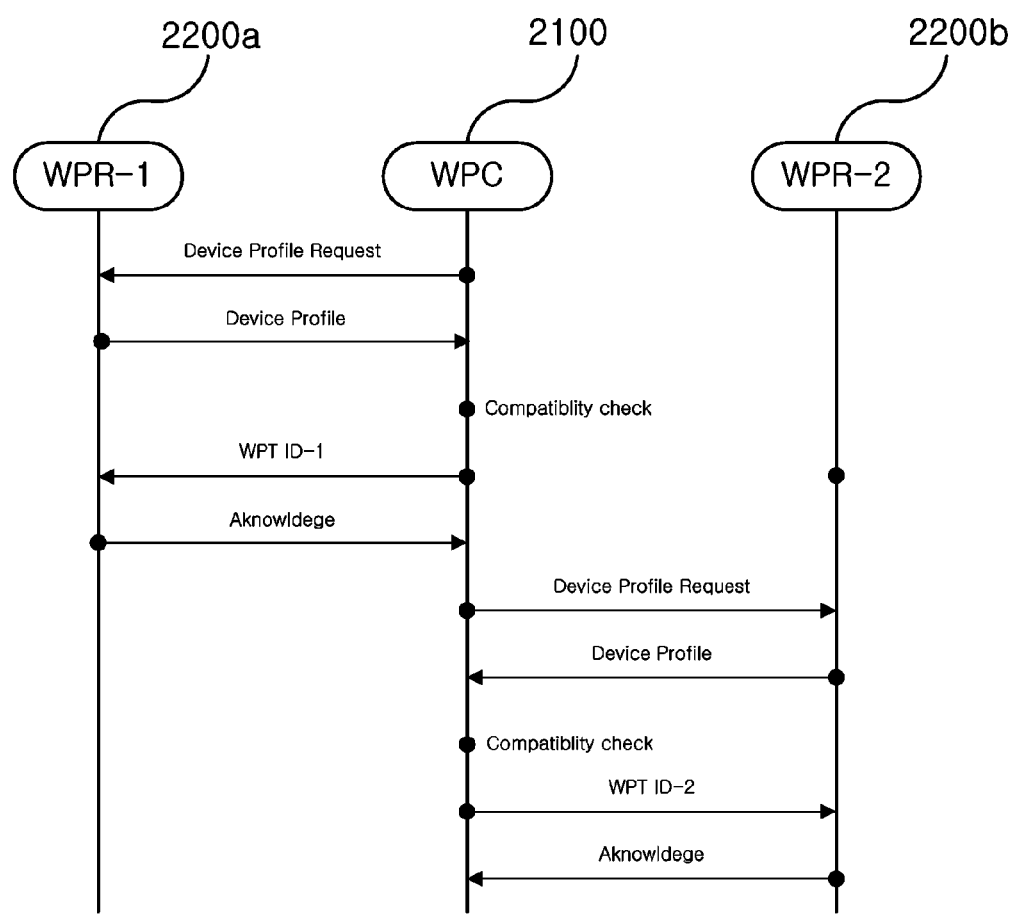
FIG. 9 is a detailed flowchart of steps constituting a charging network in the wireless power transceiving method according to the embodiment of the present invention.

In detail, the method that configures the power network will be described by referring FIG. 9. FIG. 9 is a detailed flowchart of steps constituting a charging network in the wireless power transceiving method according to the embodiment of the present invention.

Referring to FIG. 9, the charger 2100 transmits a first device profile request message to the first receiver 2200*a*. The first receiver 2200*a* may transmit a first device response message including information regarding a device profile of the first receiver 2200*a* in response thereto. The charger

2100 may determine the compatibility according to whether a wireless power transmission standard scheme of the first receiver 2200*a* corresponds to the standard supported by the charger 2100 based on the device profile of the first receiver 2200*a*. When the compatibility is possible, the charger 2100 may allocate the first power ID (WPT ID-1) to the first receiver 2200*a* and transmit a message including the power ID to the first receiver 2200*a*. The first receiver 2200*a* may configure the first power ID (WPT ID-1) as the power ID thereof by receiving the message and transmit the verification message to the charger 2100.

When configuring the power ID of the first receiver 2200*a* is terminated, the charger 2100 may transmit a second device profile request message to the second receiver 2200*b* and transmit a second device response message including a device profile thereto to the charger 2100 in response thereto. The charger 2100 may determine compatibility of the wireless power transmission of the second receiver 2200*b* by referring to the device profile, allocate the second power ID (WPT ID-2) to the second receiver 2200*b* when there is the compatibility, and transmit a message including the allocated second power ID (WPT ID-2) to the second receiver 2200*b*. The second receiver 2200*b* may configure the second power ID (WPT ID-2) as the power ID thereof by receiving the message and transmit the verification message to the charger 2100.

Herein, a message used for the configuration of the communication network may be implemented in a message format defined in the standard by the corresponding receiver 2200 for each receiver 2200 corresponding to the message. Since the charger 2100 may determine which each receiver uses in the step of searching the receiver 2200, the charger 2100 may determine a format of a message which each receiver 2200 will transmit and receive based on the determination.

For example, the first device profile message may be provided as the signals of the frequency band and the carrier according to the first standard and the second device profile message may be provided as the signals of the frequency band and the carrier according to the second standard. Another message used in step S130 is also similar.

As a result, the compatibility of each receiver 2200 is determined and the power ID is allocated based on the determined compatibility to configure the power network.

Meanwhile, in step S130, which receiver 2200 the message is transmitted and received with may be determined by using predetermined communication ID in headers of messages between the charger 2100 and the receivers 2200. For example, the communication ID COM-1 of the first receiver 2200*a* may be included in the a header of the first device profile request message and the first receiver 2200*a* among the receivers 2200 may determine whether the corresponding message is a message transmitted thereto.

When configuring the power network is completed, the charger 2100 may configure the power transceiving mode (S140).

The charger 2100 may configure the power transmission mode. The power transceiving mode may include a single mode and multiple modes. Herein, the multiple modes may include a simultaneous mode, a time division mode, and a time division simultaneous mode.

For example, the charger 2100 may select the power transceiving mode by considering the number of receives 2200 allocated with the power IDs, the power transceiving mode supported by the receiver 2200, and the standard used by the receiver 2200 and other information included in the device profile.

When only one receiver 2200 is provided in the power network, the single mode may be selected as the power transceiving mode. On the contrary, when a plurality of receivers 2200 is provided in the power network, the multiple modes may be selected as the power transceiving mode.

In the multiple modes, the time division mode may be selected when there are receivers 2200 using different wireless power transceiving standards in the power network. Herein, the time division multiple access (TDMA) scheme is a scheme that divides a power transmission interval into a plurality of time slots, transmits power to the receiver 2200 allocated for each time slot by allocating the receiver 2200 for each time slot, and cuts off receiving the power by disconnecting the receiving antenna 1210 and the power receiving module 1220 or clocking the receiving antenna 1210.

When receivers 2200 that follow different standards are present, since frequency bands of magnetic fields used by the receivers 220 are different from each other, the wireless power needs to be transmitted according to one standard scheme in one time slot and the wireless power needs to be transceived according to another standard scheme in another time slot by time division for each standard, and as a result, the TDMA scheme may be selected. Meanwhile, in this case, a plurality of receivers 2200 using one standard scheme may be provided and in this case, the corresponding time slot is divided into smaller sub time slots to allow the respective receivers 2200 to receive the power for each allocated sub time slot or simultaneously charge a plurality of receivers 220 corresponding to the standard for the time slot allocated to the standard scheme.

Meanwhile, when the receivers 2200 in the power network use the same standard, any one mode of the time division mode or the simultaneous mode may be variably selected as the power transmission mode. When the corresponding standard supports only one of the time division mode and the simultaneous mode, the power transmitting mode may be selected as the supported mode.

Like this, the charger 2100 may select the power transmission mode according to the number of receivers 2200 in the power network or the number of standard schemes of the receivers 2200 and herein, when there is a mode which the respective receivers 2200 do not support, the corresponding mode should not be selected.

When configuring the power transmissions mode is terminated, the wireless power may be transceived according to the selected mode (S150).

The charger 2100 may transmit wireless power transmission request messages to the receivers 2200. The charger 2100 may transmit and receive wireless power transmission response messages in response thereto. The charger 2100 primarily calculates wattage, voltage, current, and the like to be transmitted to the corresponding receiver 2200 based on the wireless power transmission request or response messages.

Next, the charger 2200 may transmit a message including information regarding the power transmission mode to the receiver 2200. The message may include information regarding time slot division for the power transmission interval and information regarding the receiver 2200 allocated with each time slot with respect to the time division mode together with information regarding which mode of the power transmission modes the power transmission is to performed. The receiver 2200 may determine the power transmission mode by receiving the message and determine which time slot is received when the power transmission interval is time-divided. As a result, the receiver 2200 may be activated during the time slot interval allocated thereby and deactivated during time slot intervals not allocated thereby.

Next, the charger 2100 may transmit test power. The receiver 2200 that receives the test power may transmit an apparatus state message including information regarding power, voltage, current, and the like received by the test power in response thereto. The charger 2100 transmits the power to the receiver 2200 by adjusting the transmitted power like impedance matching, adjustment of an amplification ratio, and the like based on the apparatus state message. During the power transmission, the receiver 2200 transmits a power value, a voltage value, a current value, and the like for periodically received power and the charger 2100 reflects the transmitted power value, voltage value, current value, and the like to control the transmission power.

Finally, when the power transmission is terminated, the charger 2100 transmits a message for notifying the termination of the power transmission to the receiver 2200 to finish the power transmission.

Figure 10:
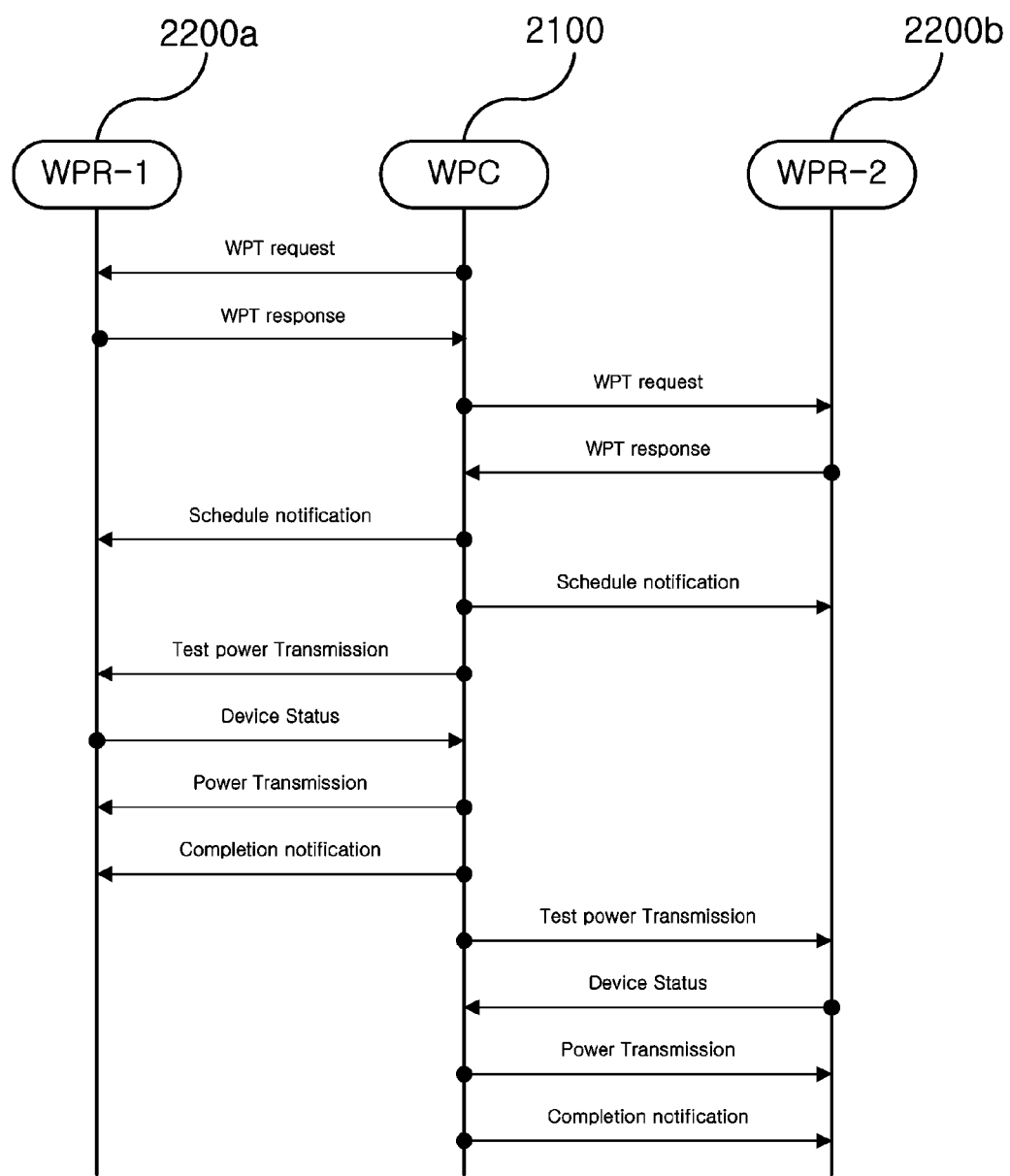
FIG. 10 is a detailed flowchart of steps of transceiving power in the wireless power transceiving method according to the embodiment of the present invention.
Figure 11:
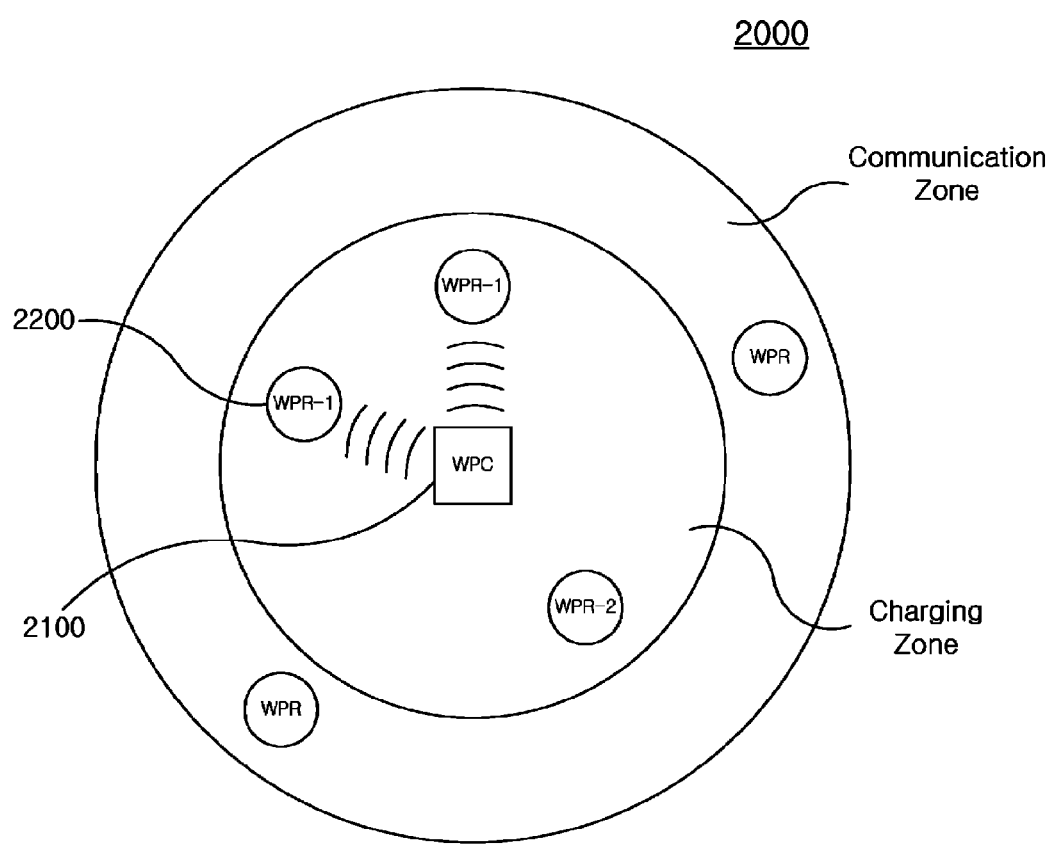
FIGS. 11 and 12 are operation diagrams of a wireless power network in the wireless power transceiving method according to the embodiment of the present invention.
Figure 12:
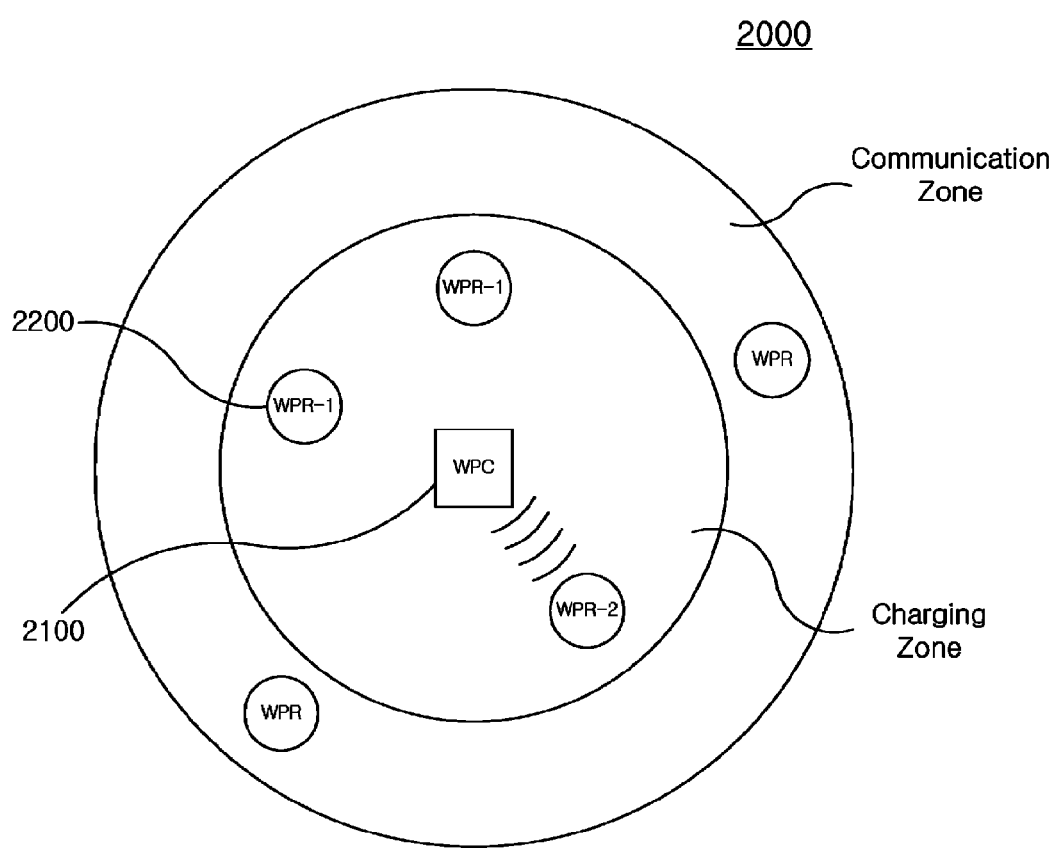

In detail, the method for transmitting power will be described with reference to FIGS. 10 to 12. FIG. 10 is a detailed flowchart of steps of transceiving power in the wireless power transceiving method according to the embodiment of the present invention. FIGS. 11 and 12 are operation diagrams of a wireless power network in the wireless power transceiving method according to the embodiment of the present invention.

Referring to FIG. 10, the charger 2100 transmits a first power transmission request message to the first receiver 2200a. The receiver 2200a may transmit to a first power transmission response message to the charger 2100 in response thereto. The charger 2100 may adjust transmission power to be performed with respect to the first receiver 2200a based on the first power transmission response message. Referring to FIG. 10, the charger 2100 transmits a second power transmission request message to the second receiver 2200b. The second receiver 2200b may transmit to a second power transmission response message to the charger 2100 in response thereto. The charger 2100 may adjust transmission power to be performed with respect to the second receiver 2200b based on the second power transmission response message.

Next, the charger 2100 transmits a message including the information on the power transmission mode and scheduling information to the first receiver 2200a. The scheduling information may be included when the time division mode is selected. The scheduling information may include information dividing the time slot and information indicating the time slot allocated by the first receiver 2200a. The first receiver 2200b may determine in which time slot the first receiver 2200b is to be activated based on the scheduling information. Similarly, the charger 2100 transmits the message including the information on the power transmission mode and the scheduling information to the second receiver 2200b. The scheduling information may include the information dividing the time slot and information indicating the time slot allocated by the second receiver 2200a.

The charger 2100 transmits the message including the power transmission mode and the scheduling information to each receiver 2200 and thereafter, starts transmitting the power to each receiver 2200.

For example, when the first receiver 2200a and the second receiver 2200b are apparatuses that follow different standards, the power transmission intervals may be acquired by dividing the time slots for the respective receivers 2200. First, the charger 2100 may transmit the power to the first receiver 2200a in a first time slot and the charger 2100 may transmit the power to the second receiver 2200b in a second time slot. In this case, the first receiver 2200a may be activated during the first time slot allocated thereby and deactivated during the second time slot. Further, the second receiver 2200b may be activated during the second time slot allocated thereby and deactivated during the first time slot.

When the first time slot starts, the charger transmits the test power to the first receiver 2200a as illustrated in FIG. 11. Herein, as illustrated in FIG. 11, one or a plurality of first receivers 2200a may be provided. When the plurality of first receivers 2200a is provided, the charger 2100 may transmit the wireless power to the plurality of first receivers 2200a in the simultaneous mode or time division mode (the scheme of dividing the sub time slot and allocating the plurality of first receivers 2200a to each sub time slot). This is a scheme which may be applied even to the second time slot when a plurality of second receivers 2200b is provided.

The first receiver 2200a may feed back at least one of the power value, the voltage value, and the current value received in response to the test power to the charger 2100. The charger 2100 may perform power transmission or impedance matching based on the fed-back value and transmit the wireless power to the first receiver 2200a based thereon. The first receiver 2200a may feed back the information (voltage value, current value, and the like) which is periodically received while the wireless power is transmitted and the charger 2100 may control the resulting transmitted power and match impedance. When the first time slot ends, the charger 2100 transmits a message indicating the end of the first time slot to the first receiver 2200a. As a result, the first receiver 2200a may be deactivated after verifying that the first time slot ends. In this case, the message indicating the end of the first time slot may be transmitted even to the second receiver 2200b. As a result, the second receiver 2200b may be deactivated by preparing the second time slot after verifying that the first time slot ends.

When the second time slot starts, the charger 2100 transmits the test power to the second receiver 2200b as illustrated in FIG. 12. The second receiver 2200b may feed back at least one of the power value, the voltage value, and the current value received in response to the test power to the charger 2100. The charger 2100 may perform the power transmission or impedance matching based on the fed-back value and transmit the wireless power to the second receiver 2200b based thereon. The second receiver 2200b may feed back the information (voltage value, current value, and the like) which is periodically received while the wireless power is transmitted and the charger 2100 may control the resulting transmitted power and match the impedance.

Meanwhile, the transmission of the wireless power performed in the first time slot and the second time slot may be transmitted according to the first standard and the second standard, respectively. In detail, the frequency band of the magnetic field of the wireless power performed during the first time slot and the frequency band of the magnetic field of the wireless power performed during the second time slot may be different from each other and in one time slot the power transmission may be performed according to the resonance magnetic coupling scheme and in the other one time slot, the power transmission may be performed according to the electromagnetic inductive coupling scheme. In other words, the magnetic fields transmitted in the first time slot and the second time slot may be different from each other in at least one of the frequency band and the transmission scheme.

Further, the feed-back may also be performed in each of the scheme according to the first standard and the scheme according to the second standard. In one time slot, the current value may be fed back and in the other time slot, the voltage value may be fed back. Further, in one time slot, the feed-back may be performed in the magnetic field in-band communication scheme and in the other time slot, the feed-back may be performed in the out-band communication scheme. That is, the feed-back in the first time slot and the feed-back in the second time slot may be different from each other in at least one of the used frequency band, the communication scheme such as the in-band/out-band type, and a type of information included in the feed-back.

When the second time slot ends, the transmission of the wireless power may end.

Since all steps are required in the method for transceiving wireless power according to the embodiment of the present invention, the method for transceiving wireless power may be performed by some or all of the aforementioned steps. Further, the embodiments of the method for transceiving wireless power may be performed through combinations thereof. In addition, the aforementioned respective steps need not particularly be performed according to the described order and a step described later may be performed prior to a step described formerly.

The above description is illustrative purpose only and various modifications and transformations become apparent to those skilled in the art within a scope of an essential characteristic of the present invention. Therefore, the embodiments described hereinabove may be implemented separately from or in combination with each other.

Accordingly, the various embodiments disclosed herein are not intended to limit the technical spirit but describe with the scope of the technical spirit of the present invention. The scope of the present invention should be interpreted by the appended claims and all technical spirit in the equivalent range is intended to be embraced by the appended claims of the present invention.

DESCRIPTION OF MARK

1000: wireless power system
1100: wireless power transmission apparatus
1110: power transmission module
1111: AC-DC converter
1112: frequency oscillator
1113: power amplifier
1114: impedance matcher
1120: transmitting antenna
1125: communication antenna
1130: a communication module
1131: in-band communication module
1132: out-band communication module
1140: controller
1200: wireless power receiving apparatus
1210: receiving antenna
1215: communication antenna
1220: power receiving module
1221: impedance matcher
1222: rectifier
1223: DC-DC converter
1224: battery
1230: communication module
1240: controller
2000: wireless power network
2100: wireless power charger
2200: wireless power receiver

What is claimed is:

1. A wireless power transmitting apparatus comprising:
a power transmitting module transmitting wireless power by using a magnetic field of a frequency band from among a plurality of predetermined frequency bands;
a communication module performing communication with a wireless power receiving apparatus; and
a controller receiving a plurality of device profiles reflecting a frequency band used by a plurality of wireless power receiving apparatuses for transceiving the wireless power from the plurality of wireless power receiving apparatuses respectively, and configuring a power transmission mode based on the plurality of device profiles,
wherein the power transmission mode includes a simultaneous mode of simultaneously transmitting the wireless power to the plurality of wireless power receiving apparatuses, a time division mode of transmitting the wireless power to the plurality of wireless power receiving apparatuses in a time division scheme, and a time division simultaneous mode of transmitting the wireless power to the plurality of wireless power receiving apparatuses simultaneously during a time-divided interval in a time division scheme.

2. The wireless power transmitting apparatus of claim 1, wherein the controller determines the frequency band used by the plurality of wireless power receiving apparatuses for transceiving the wireless power based on the plurality of device profiles and configures the power transmission mode according to whether the frequency band used by the plurality of wireless power receiving apparatuses are the same as or different from each other.

3. The wireless power transmitting apparatus of claim 2, wherein the controller configures the power transmission mode as the time division mode or the time division simultaneous mode when two or more frequency bands for transceiving the wireless power are provided.

4. The wireless power transmitting apparatus of claim 2, wherein each of the plurality of device profiles includes support mode information indicating a mode which the wireless power receiving apparatus supports between the time division mode and the simultaneous mode.

5. The wireless power transmitting apparatus of claim 4, wherein the controller configures the power transmission mode based on the support mode information when all frequency bands for transceiving the wireless power are the same as each other.

6. The wireless power transmitting apparatus of claim 5, wherein when all frequency bands for transceiving the wireless power are the same as each other, the controller configures the power transmission mode as the time division mode if the supported mode is the time division mode and as the simultaneous mode if the supported mode is the simultaneous mode.

7. The wireless power transmitting apparatus of claim 4, wherein the controller configures the power transmission mode based on the support mode information when two or more frequency bands for transceiving the wireless power are provided.

8. The wireless power transmitting apparatus of claim 7, wherein when two or more frequency bands for transceiving the wireless power are provided, the controller configures the power transmission mode as the time division mode if the supported mode is the time division mode and as the time division simultaneous mode if the supported mode is the simultaneous mode.

9. A wireless power transmitting apparatus comprising:
a power transmitting module transmitting wireless power by using a first magnetic field of a first frequency band or a second magnetic field of a second frequency band different from the first frequency band;
a communication module performing communication with a wireless power receiving apparatus; and
a controller sensing the winless power receiving apparatus positioned in a wireless power transmission range, dividing a power transmission interval into a first time slot and a second time slot when at least one first wireless power receiving apparatus using the first magnetic field and at least one second wireless power receiving apparatus using the second magnetic field are positioned within the wireless power transmission range, supplying power to the at least one first wireless power receiving apparatus by transmitting the first magnetic field through the power transmitting module during the first time slot, and supplying power to the at least one second wireless power receiving apparatus by transmitting the second magnetic field through the power transmitting module during the second time slot,
wherein the controller transmits a first message indicating allocation of the first time slot to the first wireless power receiving apparatus through the communication module and a second message indicating allocation of the second time slot to the second wireless power receiving apparatus through the communication module,
wherein the communication module includes a first communication module and a second communication module different from the first communication module in a frequency band or a communication carrier, and
wherein the controller transmits the first message through the first communication module and the second message through the second communication module.

10. The wireless power transmitting apparatus of claim 9, wherein:
the first communication module is an in-band communication module that performs communication by using the first magnetic field, and
the second communication module is an in-band communication module that performs communication by using the second magnetic field.

11. The wireless power transmitting apparatus of claim 9,
wherein the first communication module is the in-band communication module that performs communication by using the first magnetic field, and
wherein the second communication module is an out-band communication module that performs communication by using the communication carrier other than the magnetic field.

12. The wireless power transmitting apparatus of claim 11, wherein the second communication module supports at least one communication protocol of Bluetooth, Zigbee, RFID, NFC, and WiFi.

13. The wireless power transmitting apparatus of claim 9, wherein the first wireless power apparatus allows receiving the power in the first time slot and cuts off receiving the power in the second time slot based on the first message, and
wherein the second wireless power apparatus cuts off receiving the power in the first time slot and allows receiving the power in the second time slot based on the second message.

14. The wireless power transmitting apparatus of claim 9, wherein the controller transmits a notification message indicating the start of the time slot to the first wireless power receiving apparatus and the second wireless power receiving apparatus through the communication module when each time slot starts, and
wherein the first wireless power receiving apparatus and the second wireless power receiving apparatus determine the start of the time slot based on the notification message and determine permitting and cutting off the reception of the power according to the determination result.

* * * * *